July 2, 1963   E. P. WORTHEN ETAL   3,096,256
MULTISTAGE FLASH DISTILLING PLANT
Filed Jan. 19, 1959   3 Sheets-Sheet 1

INVENTORS
Eugene Porter Worthen
Fenner Smith Barbour
BY Nat M Emery Jr.
ATTORNEY July 2, 1963
E. P. WORTHEN ETAL
3,096,256
MULTISTAGE FLASH DISTILLING PLANT
Filed Jan. 19, 1959
3 Sheets-Sheet 2
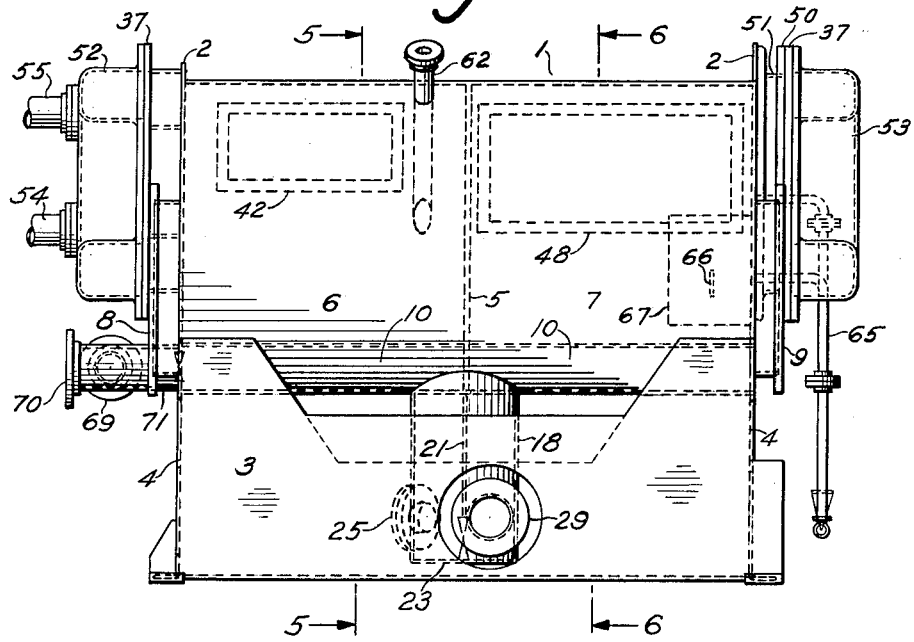
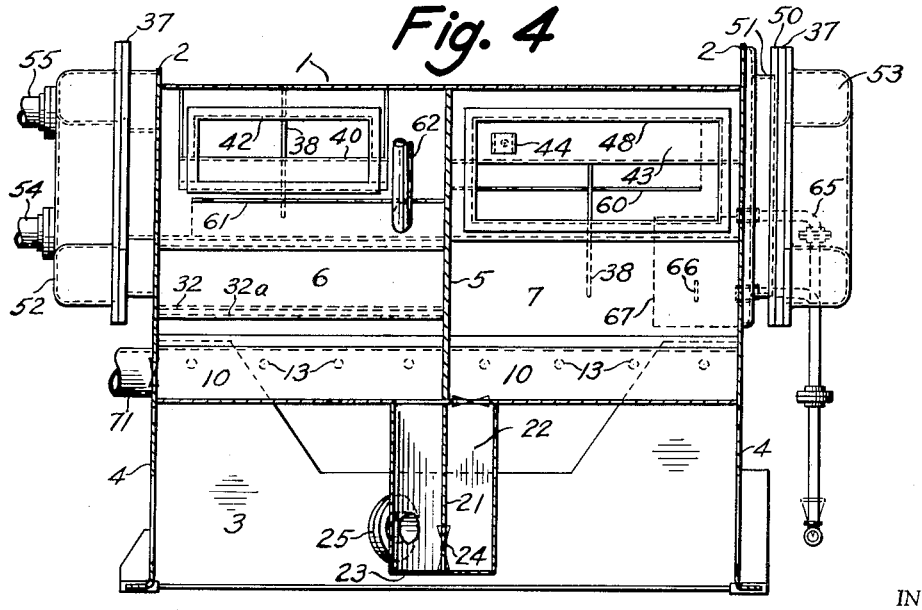
INVENTORS
Eugene Porter Worthen
Fenner Smith Barbour
BY *Natt M Emery Jr.*
ATTORNEY

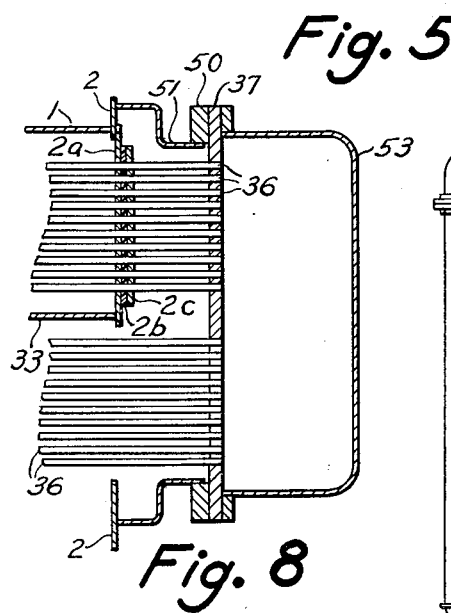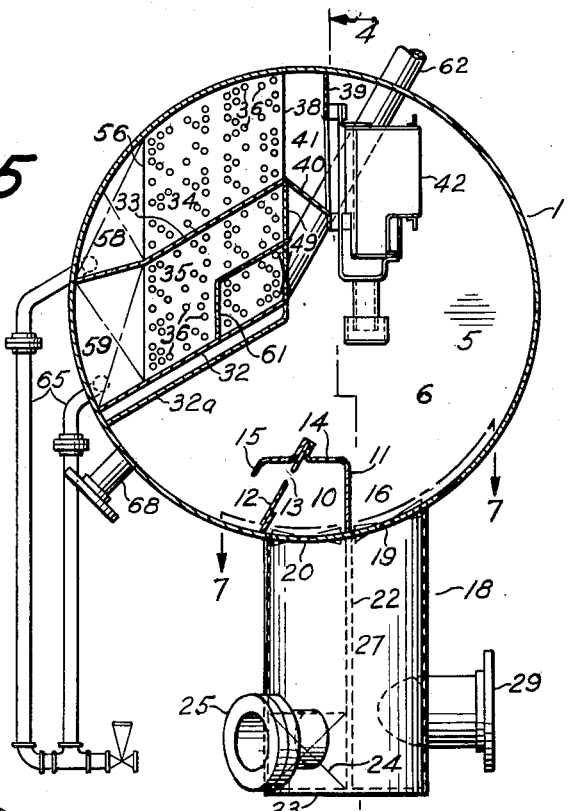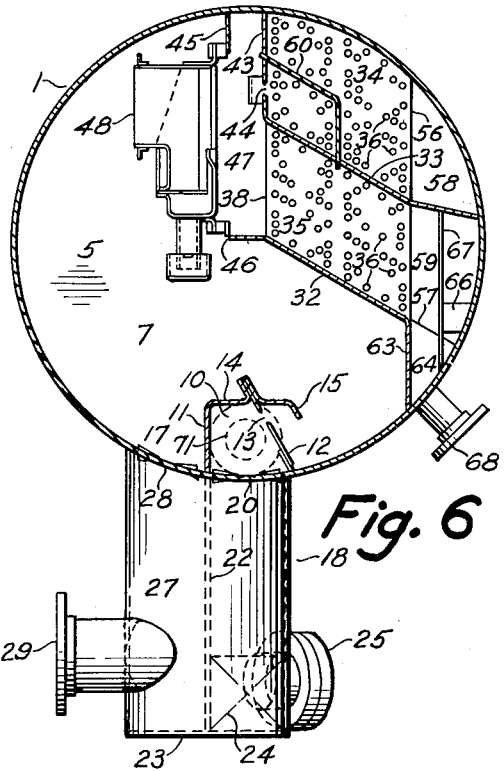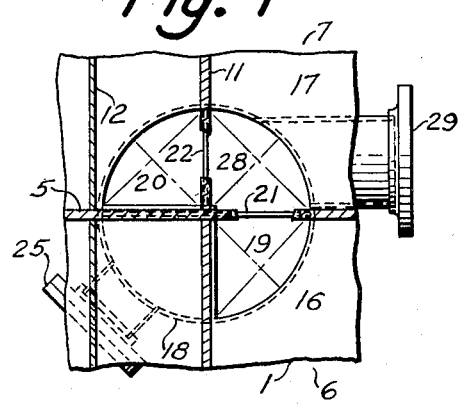

United States Patent Office 3,096,256
Patented July 2, 1963

3,096,256
MULTISTAGE FLASH DISTILLING PLANT
Eugene Porter Worthen, Braintree, and Fenner Smith Barbour, Wollaston, Mass., assignors to Bethlehem Steel Company, a corporation of Pennsylvania
Filed Jan. 19, 1959, Ser. No. 787,628
17 Claims. (Cl. 202—173)

This invention relates to flash distilling plants in general and, in particular, to a multistage flash distilling plant wherein the condensers for each stage extend the full length of the plant.

In the preferred embodiment of our invention, we provide two stages of flash distillation in a shell, each of said stages extending for approximately half the length of said shell, said stages being arranged in end-to-end relationship. We further provide two condensers, one for each stage, said condensers being stacked one above the other and both condensers extending the full length of the shell. We also provide novel combined feed transfer means and sump means for the transfer of feed water between stages, for providing a loop seal to assist in maintaining pressure differential between stages, and for providing a sump for the excess feed of the last stage of said flash distilling plant.

One of the objects of our invention is to provide a novel multistage flash distilling plant comprising a number of stages of flash distillation therein, each of said stages extending less than the full length of the shell of said plant, with condensers for each of said stages, each of said condensers extending the full length of the shell of said plant.

Another object of our invention is to provide a multistage flash distilling plant wherein fewer condenser tubes per stage will be required, thereby considerably reducing the number of drilling operations and sealing operations required in fabricating and assembling the various tube sheets.

A further object of our invention is to provide novel combination feed transfer means and sump means in association with such multistage flash distilling plant wherein said combined means transfers feed from one stage to the next, provides a loop seal for the maintenance of pressure differential between stages, and provides a sump for the excess feed from the last stage of said plant.

Still another object of our invention is to minimize the number of water chests and amount of piping required in multistage flash distilling plants.

Other and further objects of our invention will become apparent during the course of the following description. Referring now to the accompanying drawings, in which like numerals represent like parts in the several views:

FIGURE 3 represents a view in elevation of the right side of the multistage flash distilling plant.

FIGURE 4 represents a section in elevation of the multistage flash distilling plant, taken along the line 4—4 of FIGURE 5.

FIGURE 5 represents a section in elevation of the first stage of the multistage flash distilling plant, taken along the line 5—5 of FIG. 3, showing the internal arrangement in the evaporator shell, and omitting the shell supporting members for purposes of clarity.

FIGURE 6 represents a section in elevation of the second stage of the multistage flash distilling plant, taken along the line 6—6 of FIG. 3, showing the internal arrangement in the evaporator shell, and omitting the shell supporting members for purposes of clarity.

FIGURE 7 represents a section in plan taken along the line 7—7 of FIG. 5, showing the loop seal and transfer pot and its relation to the stages of the multistage flash distilling plant.

FIGURE 8 represents a section in elevation taken along the line 8—8 of FIG. 2, somewhat enlarged to show the detail of the sealing arrangement adjacent one end of the first stage condenser.

Figure 1:
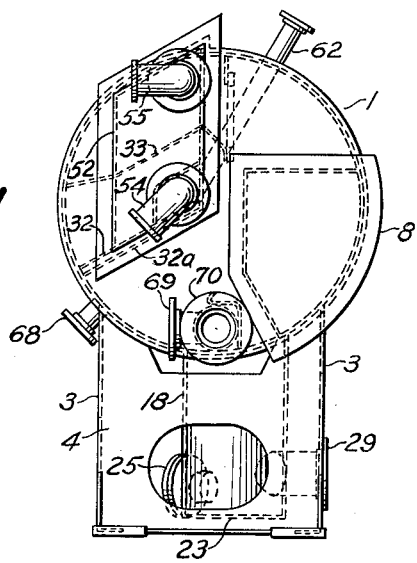
FIGURE 1 represents a view in elevation of the front of the multistage flash distilling plant.

The multistage flash distilling plant is seen to comprise shell 1 provided with end closures 2 and supported by members 3 and 4 in any suitable manner. Partial division wall 5 is transversely mounted therein adjacent the middle thereof to define first and second stages 6 and 7, each of said stages extending approximately half the length of the shell 1. First and second stage access covers 8 and 9, respectively, are provided as shown in the drawings. Feed ducts 10 are arranged adjacent the bottoms of stages 6 and 7, and each comprises wall 11, wall 12 provided with longitudinally spaced orifices 13, and top plates 14 and 15. It will be seen, upon examination of FIGURES 5 and 6, that exterior to feed ducts 10, between wall 11 and shell 1, there are provided excess feed channels 16 and 17 in first and second stages 6 and 7, respectively. Channel 16 collects the excess feed from first stage 6 and this feed is passed therefrom into feed duct 10 of second stage 7 through loop seal and transfer pot 18.

Loop seal and transfer pot 18 is arranged under division wall 5, in communication between channel 16 of first stage 6 and feed duct 10 of second stage 7 through shell openings 19 and 20 respectively, and is provided with walls 21 and 22 and with bottom closure 23. Wall 21, in alignment with division wall 5, extends from the top of pot 18 down to the bottom thereof, and is provided with opening 24. A flanged cleanout 25 is provided as shown in FIGURE 7. Wall 22, placed adjacent the second stage side of wall 21, at right angles to wall 21, extends from the top of pot 18 down to the bottom thereof and, with wall 21 and pot 18, defines sump compartment 27 which does not communicate with the remainder of the space in pot 18.

Sump compartment 27 of pot 18 communicates with excess feed channel 17 through opening 28 in shell 1, and is provided with outlet 29 from whence, by suitable pumping means (not shown), the excess feed may be discharged from the multistage flash distilling plant.

The interior of shell 1 is provided, in stages 6 and 7, with wrapper plates 32 and division plates 33 defining first and second stage condensers 34 and 35 serving first and second stages 6 and 7 respectively. These first and second stage condensers 34 and 35 extend the full length of shell 1, and are provided with tubes 36 extending from one tube sheet 37 to the other, being supported by division wall 5 and by suitably spaced intermediate tube support plates 38. Division wall 5 and intermediate tube support plates 38 are all drilled identically to tube sheets 37. It will be seen that half of each condenser overlies its respective stage and the other half of said condenser overlies the next stage. That half of first stage condenser 34 overlying first stage 6 is further provided with plates 39 and 40, and communicates with first stage 6 only through chamber 41 and vapor separator 42. That half of first stage condenser 34 overlying second stage 7 is provided with plate 43 which cooperates with division plate 33 to seal off said half of said first stage condenser 34 from second stage 7 and from second stage condenser 35 except through vent opening 44 in plate 43. That half of second stage condenser 35 overlying second stage 7 is provided with plates 45 and 46 and communicates with second stage 7 only through chamber 47 and vapor separator 48. That half of second stage condenser 35 overlying first stage 6 is provided with plate 49 which cooperates with division plate 33 to seal off said half of said second stage condenser 35 from said first stage 6. Further, wrapper plate 32 associated with that half of second stage condenser 35 overlying the first stage 6 is provided with insulating plate 32a, as shown in FIGURE 5. It will be apparent to one familiar with the evaporator art that first stage 6 operates at a higher temperature and pressure than second stage 7. Insulating plate 32a prevents this wrapper plate 32 from being heated by the vapors in said first stage 6 to such a temperature as may cause revaporization of the distillate from the second stage condenser 35 collecting on this wrapper plate 32.

End closures 2 are open in the way of the bundles of tubes 36 in first and second stage condensers 34 and 35, respectively, at both ends of shell 1. In first stage 6, wrapper plate 32 is welded to end closure 2, and division plate 33 is also welded to end closure 2. Where end closure 2 is open (in way of the tube bundles), division plate 33 extends through said opening to tube sheet 37 and is suitably secured thereto. Thus, those halves of first and second stage condensers 34 and 35 in said first stage 6 are sealed off from each other. It will be noted that tube sheet 37 adjacent second stage 7 is secured to flange 50 which is connected to shell 1 through an expansion joint 51 to provide for expansion and contraction of tubes 36. In order to seal off those halves of first and second stage condensers 34 and 35 in second stage 7, we provide sealing means as shown in FIG. 8. Thus, plate 2a, provided with perforations registering with, and slightly larger than, the tubes 36 is welded to end closure 2 and division plate 33 as shown. Rubber-like gasket 2b, provided with perforations registering with and slightly smaller than tubes 36 is forced against plate 2a by means of plate 2c, the latter being provided with perforations similar to those in plate 2a and held against said plate 2a by threaded bolts or the like.

Water chests 52 and 53 communicate with tubes 36, and are suitably equipped with internal compartmentation or baffling for one or more passes in each condenser as desired. Moreover, water chest 52 will also have inlet 54 and outlet 55.

It will be seen, particularly upon examination of FIGURES 5 and 6, that division wall 5 does not completely transversely divide shell 1 into two parts, but rather is provided with rear edges 56 and 57, defining, with division plate 33 and shell 1, openings 58 and 59 above and below, respectively, said division plate 33. Opening 58 communicates between the two halves of first stage condenser 34. Similarly, opening 59 communicates between the two halves of second stage condenser 35.

Figure 2:
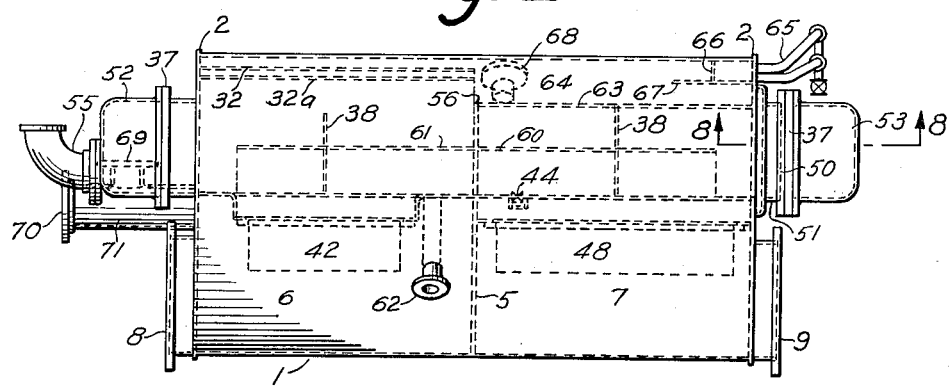
FIGURE 2 represents a view in plan of the multistage flash distilling plant.

As shown particularly in FIGURE 2, air cooler baffles 60 and 61 are provided in first and second stage condensers 34 and 35 respectively, adjacent vent opening 44 and line 62 respectively, said air cooler baffles 60 and 61 extending from division wall 5 towards, but not touching, end closures 2.

It is customary to operate multistage flash distilling apparatus under reduced pressure, the stages thereof being arranged in order of increasing vacuum (or decreasing pressure). The means for evacuating such stages are well-known and will not be described herein other than to say that we prefer the conventional ejector which exercises a vacuum through line 62 communicating with the space defined by air cooler baffle 61, a lesser degree of vacuum being effected in first stage 6 through vent opening 44.

It will be seen, upon examination of FIGURE 6, that wrapper plate 32 in the second stage 7 is bent downwardly so as to form a vertically extending element 63. This element 63 may, of course, be a separate piece suitably secured to wrapper plate 32. Element 63, division wall 5, end closure 2, and shell 1 all cooperate to form a distillate collecting pocket 64 in said second stage 7. Distillate from first stage condenser 34, collecting on division plate 33, flows towards that end of first stage condenser 34 overlying the second stage 7, and is cascaded through distillate loop seal 65 into the second stage condenser 35, wherein said distillate impinges against baffles 66 and 67, thereby preventing erosion of tubes 36, and collects in distillate collecting pocket 64. Distillate from that end of second stage condenser 35 overlying the first stage 6 collects on wrapper plate 32 and flows towards and into distillate collecting pocket 64. Distillate from that end of second stage condenser 35 overlying the second stage 7 flows down wrapper plate 32 into said distillate collecting pocket 64. Distillate outlet means 68 are provided in communication with distillate collecting pocket 64 whereby the distillate can be withdrawn by any suitable means (not shown).

The operation of our multistage flash distilling plant will now be described:

Heated feedwater passes from conventional feed control valve means (not shown) into inlet 69, passing through feed strainer 70 and thence into inlet 71 communicating with one end of feed duct 10 of first stage 6. The heated feed escapes through orifices 13 into the shell 1 where a portion of said feed flashes to vapor. The remainder of the feed (which does not flash in a particular stage) will be termed "excess" feed (viz., excess insofar as that particular stage is concerned).

The mixture of flashed vapor and excess feed entering stage 6 impinges on deflecting means 15 as shown in FIG. 5 producing a curtain-like spray of liquid feed through which the vapor passes and loses some of its entrained fog. The mixture then passes through an arc-like path formed by shell 1 and wall 32a, producing a second curtain-like spray through which the vapor passes to remove additional fog. The excess feed collects in excess feed channel 16, flows to pot 18 through opening 19 and down one side of wall 21, under wall 21 through opening 24 therein, up the other side of wall 21 (except, of course, for that side of wall 21 lying within sump compartment 27), and through opening 20 into feed duct 10 of second stage 7. Here again the heated feed escapes through orifices 13 into the shell 1 where another portion of said feed flashes to vapor, the mixture of flashed vapor and excess feed reversing direction for purposes of removing fog. The excess feed collects in excess feed channel 17, flows through opening 28 into sump compartment 27 of pot 18, and is discharged through outlet 29 by suitable pumping means (not shown).

Vapor in first stage 6 passes through vapor separator 42 into chamber 41 and thence into that half of first stage condenser 34 overlying said first stage 6, wherein a portion of such vapor is condensed. The remainder of said vapor passes through opening 58 into the second half of first stage condenser 34, overlying the second stage 7, wherein another portion of vapor is condensed. The uncondensible vapors from the second half of said first stage condenser 34 are cooled in the space defined by air cooler baffle 60 and are evacuated through vent opening 44 into chamber 47.

Vapor in second stage 7 passes through vapor separator 48 into chamber 47 and thence into that half of second stage condenser 35 overlying said second stage 7, wherein a portion of said vapor is condensed. The remainder of said vapor passes through opening 59 into the second half of second stage condenser 35 overlying first stage 6, wherein another portion of vapor is condensed. The uncondensible vapors from the second half of said second stage condenser 35 are cooled in the space defined by air cooler baffle 61 and are evacuated, along with the uncondensible vapors from the second half of first stage condenser 34 (which vapors passed into chamber 47 and through the two sections of second stage condenser 35), through line 62 by conventional evacuation means not shown.

Distillate from both halves of first stage condenser 34 collects on division plate 33 and flows through distillate loop seal 65 to distillate collecting pocket 64, wherein it is combined with distillate from both halves of second stage condenser 35, and the combined distillate is withdrawn through distillate outlet means 68 by suitable pumping means (not shown).

The coolant for first and second stage condensers 34 and 35 is by preference the feed to be flash distilled, whereby heat ordinarily wasted is used to preheat said feed and thereby provide a very efficient operation. Accordingly, we pass the unheated feed into inlet 54 of water chest 52 and thence into second stage condenser 35. The preheated feed from water chest 53 is passed through first stage condenser 34 wherein it is further preheated, and thence through outlet 55 into another heat exchanger (not shown) for further heating therein. The heated feed then enters the multistage flash distilling plant at a temperature sufficiently high for proper flash distillation therein, as we have already described.

In another embodiment of our invention, we may use, in place of the straight tubes 36 in first and second stage condensers 34 and 35, U-tubes in such manner as to do away with expansion joint 51, sealing means represented by elements 2a, b and c, tube sheet 37, flange 50, and water chest 53. In other words, by using U-tubes, we can eliminate the construction of FIG. 8. The evaporator, of course, will still require suitably compartmented water chest 52, with inlet 54 and outlet 55, communicating with those ends of each U-tube opposite the return bend. Thus, at the other end of the evaporator (viz., that end represented in a former embodiment of our invention by FIG. 8) end closure 2 will be solid and will blank off first and second stage condensers 34 and 35, and division plate 33 will extend to and be welded (or otherwise secured) to end closure 2 (thereby sealing off from each other said first and second stage condensers 34 and 35 at that end of the evaporator). The return bends of all of the U-tubes will, of course, be inside said first and second stage condenser 34 and 35 and will be suitably supported therein. To permit retubing of this embodiment of our invention, end closure 2 adjacent the return bends of the U-tubes may be provided with a normally closed access opening in way of the U-tubes.

While we have shown one embodiment of our invention in some detail, we do not wish to be limited to the exact construction and operation described, but may use such substitutions, modifications or equivalents thereof as are embraced within the scope of our invention or as pointed out in the claims.

We claim:

1. Evaporator apparatus comprising an elongated shell, a first stage and a second stage in said shell, each of said stages extending only a portion of the length of said shell, a first stage condenser and a second stage condenser within said shell, each of said condensers extending substantially the full length of said shell, first means in said first stage to conduct vapor from said first stage directly to said first stage condenser only, second means in said second stage to conduct vapors from said second stage directly to said second stage condenser only, further including first and second feed duct means in end-to-end relation in said first and second stages respectively, first and second excess feed channel means in said first and second stages respectively, feed inlet means communicating with the first feed duct means, and feed transfer means comprising a partitioned shell adjacent said first and second stages, a first chamber and a second chamber in said partitioned shell, said first chamber communicating between said first excess feed channel means and said second feed duct means, and said second chamber communicating between said second excess feed channel means and discharge.

2. Evaporator apparatus comprising an elongated shell, a first stage and a second stage in said shell, each of said stages extending only a portion of the length of said shell, a first stage condenser and a second stage condenser within said shell and operatively associated with said first and second stages respectively, each of said condensers extending substantially the full length of said shell, first and second feed duct means in end-to-end relation in said first and second stages respectively, first and second excess feed channel means in said first and second stages respectively adjacent said first and second feed duct means respectively, feed inlet means communicating with the first feed duct means, and feed transfer means comprising a partitioned shell adjacent said first and second stages, a first chamber and a second chamber within said partitioned shell, said first chamber communicating between said first excess feed channel means and said second feed duct means, and said second chamber communicating between said second excess feed channel means and discharge, further including insulating means operatively interposed between said second stage condenser and said first stage.

3. Evaporator apparatus comprising an elongated shell, a first stage and a second stage in end-to-end relation in said shell, each of said stages in length being less than the length of said shell, a first stage condenser and a second stage condenser within said shell operatively associated with said first and second stages respectively and mounted parallel to each other, each of said condensers extending substantially the full length of said shell, further including first and second feed ducts in end-to-end relation in said first and second stages respectively, first and second excess feed channels in end-to-end relation adjacent said first and second feed ducts in said first and second stages respectively, feed inlet means communicating with said first feed duct, and feed transfer means comprising a partitioned shell adjacent said first and second stages, a first chamber and a second chamber within said partitioned shell, said first chamber providing loop seal communication between said first excess feed channel and said second feed duct, and said second chamber communicating between said second excess feed channel and discharge.

4. Evaporator apparatus comprising an elongated shell, a first stage and a second stage in end-to-end relation in said shell, each of said stages in length being less than the length of said shell, a first stage condenser and a second stage condenser within said shell mounted parallel to and adjacent to each other, each of said condensers extending substantially the full length of said shell, a first stage vapor separator in said first stage communicating directly with said first stage condenser only, a second stage vapor separator in said second stage communicating directly with said second stage condenser only, first and second feed ducts in end-to-end relation in said first and second stages respectively, first and second excess feed channels in end-to-end relation adjacent said first and second feed ducts in said first and second stages respectively, feed inlet means communicating with said first feed duct, and feed transfers means comprising a partitioned shell adjacent said first and second stages, a first chamber and a second chamber within said partitioned shell, said first chamber providing loop seal communication between said first excess feed channel and said second feed duct, and said second chamber communicating between said second excess feed channel and discharge, further including insulating means operatively interposed between that stage operating at the higher temperature and pressure and that condenser associated with the stage operating at the lower temperature and pressure.

5. Evaporator apparatus comprising an elongated shell, first and second ends secured to said shell, a division wall transversely mounted in said shell and defining first and second stages with said first and second ends respectively, wrapper plate means extending between said first and second ends, division plate means extending between said first and second ends and cooperating with said wrapper plate means to define first and second stage condensers extending between said first and second ends and associated with said first and second stages respectively, a plurality of condenser tubes in said first and second stage condensers extending continuously between said first and second ends through said division wall, said division wall defining first and second segments of both of said condensers, first fluid transfer means communicating between the segments of said first stage condenser, and second fluid transfer means communicating between the segments of said second stage condenser, further including a first vapor separator operatively interposed between said first stage and one segment of said first stage condenser, and a second vapor separator operatively interposed between said second stage and one segment of said second stage condenser.

6. Evaporator apparatus comprising an elongated shell, first and second ends secured to said shell, a division wall transversely mounted in said shell and defining first and second stages with said first and second ends respectively, wrapper plate means extending between said first and second ends, division plate means extending between said first and second ends and cooperating with said wrapper plate means to define first and second stage condensers extending between said first and second ends and associated with said first and second stages respectively, a plurality of condenser tubes in said first and second stage condensers extending continuously between said first and second ends through said division wall, said division wall defining first and second segments of both of said condensers, first fluid transfer means communicating between the segments of said first stage condenser, and second fluid transfer means communicating between the segments of said second stage condenser, further including a first feed duct and a first excess feed channel extending between said first end and said division wall, a second feed duct and a second excess feed channel extending between said second end and said division wall, feed inlet means communicating with said first feed duct, and feed transfer means comprising a first chamber and a second chamber, said first chamber providing loop seal communication between said first excess feed channel and said second feed duct, and said second chamber communicating between said second excess feed channel and discharge.

7. Evaporator apparatus comprising an elongated shell, first and second ends secured to said shell, a division wall transversely mounted in said shell and defining first and second stages with said first and second ends respectively, wrapper plate means extending between said first and second ends, division plate means extending between said first and second ends and cooperating with said wrapper plate means to define first and second stage condensers extending between said first and second ends and associated with said first and second stages respectively, a plurality of condenser tubes in said first and second stage condensers extending continuously between said first and second ends through said division wall, said division wall defining first and second segments of both of said condensers, first fluid transfer means communicating between the segments of said first stage condenser, and second fluid transfer means communicating between the segments of said second stage condenser, further including insulating means operatively interposed between said first stage and the adjacent segment of said second stage condenser.

8. Evaporator apparatus comprising an elongated shell, end walls on said shell, longitudinally disposed wrapper plate means within said shell and extending between said end walls to define a condenser compartment and an evaporating compartment, longitudinally disposed division plate means within said condenser compartment extending between said end walls and cooperating with said wrapper plate means to define first and second stage condensers in said condenser compartment, transversely disposed division plate means within said shell cooperating with said longitudinally disposed wrapper plate means to define a first stage evaporator and a second stage evaporator in said evaporating compartment, condenser tubes in said first and second stage condensers extending substantially the length of said shell, means to introduce liquid to be distilled into said first and second stage evaporators, first means for conducting vapors produced in said first stage evaporator to said first stage condenser, and second means for conducting vapors produced in said second stage evaporator to said second stage condenser.

9. Apparatus as in claim 8, further including means for introducing coolant first into the condenser tubes of said second stage condenser and thence into the condenser tubes of said first stage condenser, said first stage condenser being above said second stage condenser.

10. Evaporator apparatus comprising an elongated shell, end walls on said shell, longitudinally disposed wrapper plate means within said shell and extending between said end walls to define a condenser compartment and an evaporating compartment, longitudinally disposed division plate means within said condenser compartment extending between said end walls and cooperating with said wrapper plate means to define first and second stage condensers in said condenser compartment, transversely disposed division plate means within said shell cooperating with said longitudinally disposed wrapper plate means to define a first stage evaporator and a second stage evaporator in said evaporating compartment, condenser tubes in said first and second stage condensers extending substantially the length of said shell, means to introduce liquid to be distilled into said first and second stage evaporators, first means for conducting vapors produced in said first stage evaporator to said first stage condenser, second means for conducting vapors produced in said second stage evaporator to said second stage condenser, distillate loop seal means communicating between said first and second stage condensers, distillate collecting means associated with said condensers to collect distillate therefrom, and distillate conduit means communicating between said distillate collecting means and storage.

11. Apparatus as in claim 10, further including evacuating means, conduit means communicating between said evacuating means and said condenser compartment, and baffle means in said condenser compartment defining an elongated open-ended space adjacent said conduit means for the cooling of non-condensable vapors therein.

12. Apparatus as in claim 10, further including vent means communicating between said first and second stage condensers, and baffle means in said condenser compartment adjacent said vent means defining an elongated open-ended space secluding said vent means.

13. Apparatus as in claim 10, further including vent means communicating between said first and second stage condensers, first baffle means in said condenser compartment adjacent said vent means defining a first elongated open-ended space secluding said vent means, evacuating means, conduit means communicating between said evacuating means and said condenser compartment, and second baffle means in said condenser compartment defining a second elongated open-ended space adjacent said conduit means for the cooling of non-condensable vapors therein.

14. Evaporator apparatus comprising an elongated shell having a first end and a second end, longitudinally disposed wrapper plate means within said shell and extending between said first and second ends thereof to define a condenser compartment and an evaporating compartment, longitudinally disposed division plate means within said condenser compartment extending between the first and second ends of said shell and cooperating with said wrapper plate means to define first and second stage condensers in said condenser compartment, transversely disposed division plate means within said shell cooperating with said longitudinally disposed wrapper plate means to define a first stage evaporator and a second stage evaporator in said evaporating compartment, first and second parallel tubes in said first and second stage condensers respectively and extending substantially the length of said shell, a main tube sheet adjacent the first end of said shell receiving the ends of said first and second tubes, auxiliary tube sheet sealing means adjacent said first stage condenser and said first end of said shell spaced from said main tube sheet and receiving said first tubes only, means to introduce liquid to be distilled into said first and second stage evaporators, first means for conducting vapors produced in said first stage evaporator to said first stage condenser, and second means for conducting vapors produced in said second stage evaporator to said second stage condenser.

15. Apparatus as in claim 14, further including expansion joint means operatively interposed between said main tube sheet and said auxiliary tube sheet sealing means.

16. Evaporator apparatus comprising an elongated shell, a first stage and a second stage in said shell, each of said stages extending longitudinally for only a portion of the length of said shell, a first stage condenser and a second stage condenser within said shell mounted parallel to each other, each of said condensers extending longitudinally for substantially the full length of said shell, first and second feed duct means extending longitudinally in said first and second stages respectively and being arranged in end-to-end relation with each other, first and second sides on each of said first and second feed duct means, orifice means on the first sides of said first and second feed duct means, first and second excess feed channel means extending longitudinally in said first and second stages respectively and being arranged in end-to-end relation with each other adjacent the second sides of said first and second feed duct means respectively, first means in said first stage to conduct vapor from said first stage directly to said first stage condenser only, second means in said second stage to conduct vapor from said second stage directly to said second stage condenser only, feed inlet means communicating with said first feed duct means, feed transfer means communicating between said first excess feed channel means and said second feed duct means, and conduit means communicating with said second excess feed channel means for removal of excess feed therefrom.

17. In evaporator apparatus comprising a shell with a first evaporating compartment and a second evaporating compartment therein, the combination comprising:
(a) wrapper plate means within said shell,
(b) a condenser compartment defined by said wrapper plate means and having a first end and a second end,
(c) first tube sheet means secured to the first end of said condenser compartment,
(d) second tube sheet means secured to the second end of said condenser compartment,
(e) longitudinal division plate means in said condenser compartment extending from said second tube sheet means to a point adjacent said first tube sheet means,
(f) auxiliary tube sheet means in said condenser compartment secured to said shell means and to said longitudinal division plate means adjacent to and spaced from said first tube sheet means to define first and second condensers in said condenser compartment,
(g) said first and second condensers being separated from each other by said longitudinal division plate means and said auxiliary tube sheet means,
(h) first means to conduct vapor from said first evaporating compartment to said first condenser,
(i) second means to conduct vapor from said second evaporating compartment to said second condenser,
(j) first and second parallel tubes in said first and second condensers respectively and extending from said first tube sheet means to said second tube sheet means,
(k) said first tubes and only said first tubes passing through said auxiliary tube sheet means, and
(l) expansion joint means operatively interposed between said first tube sheet means and said auxiliary tube sheet means.

References Cited in the file of this patent
UNITED STATES PATENTS

| | | |
|---|---|---|
| Re. 21,129 | Fox et al. | June 27, 1939 |
| 1,045,023 | Heisserman | Nov. 19, 1912 |
| 1,681,256 | Raleigh | Aug. 21, 1928 |
| 1,921,988 | Govers | Aug. 8, 1933 |
| 2,165,044 | Fox et al. | July 4, 1939 |
| 2,398,068 | Worthan et al. | Apr. 9, 1946 |
| 2,411,097 | Kopp | Nov. 12, 1946 |
| 2,468,903 | Villiger | May 3, 1949 |
| 2,613,177 | Worthen et al. | Oct. 7, 1952 |
| 2,759,882 | Worthen et al. | Aug. 21, 1956 |
| 2,934,477 | Siegfried | Apr. 26, 1960 |

FOREIGN PATENTS

| | | |
|---|---|---|
| 1,100,530 | France | Sept. 21, 1955 |